July 19, 1938.  E. G. MILLER  2,124,146
JAUNT FOLDING DRESS MIRROR
Filed Dec. 13, 1937
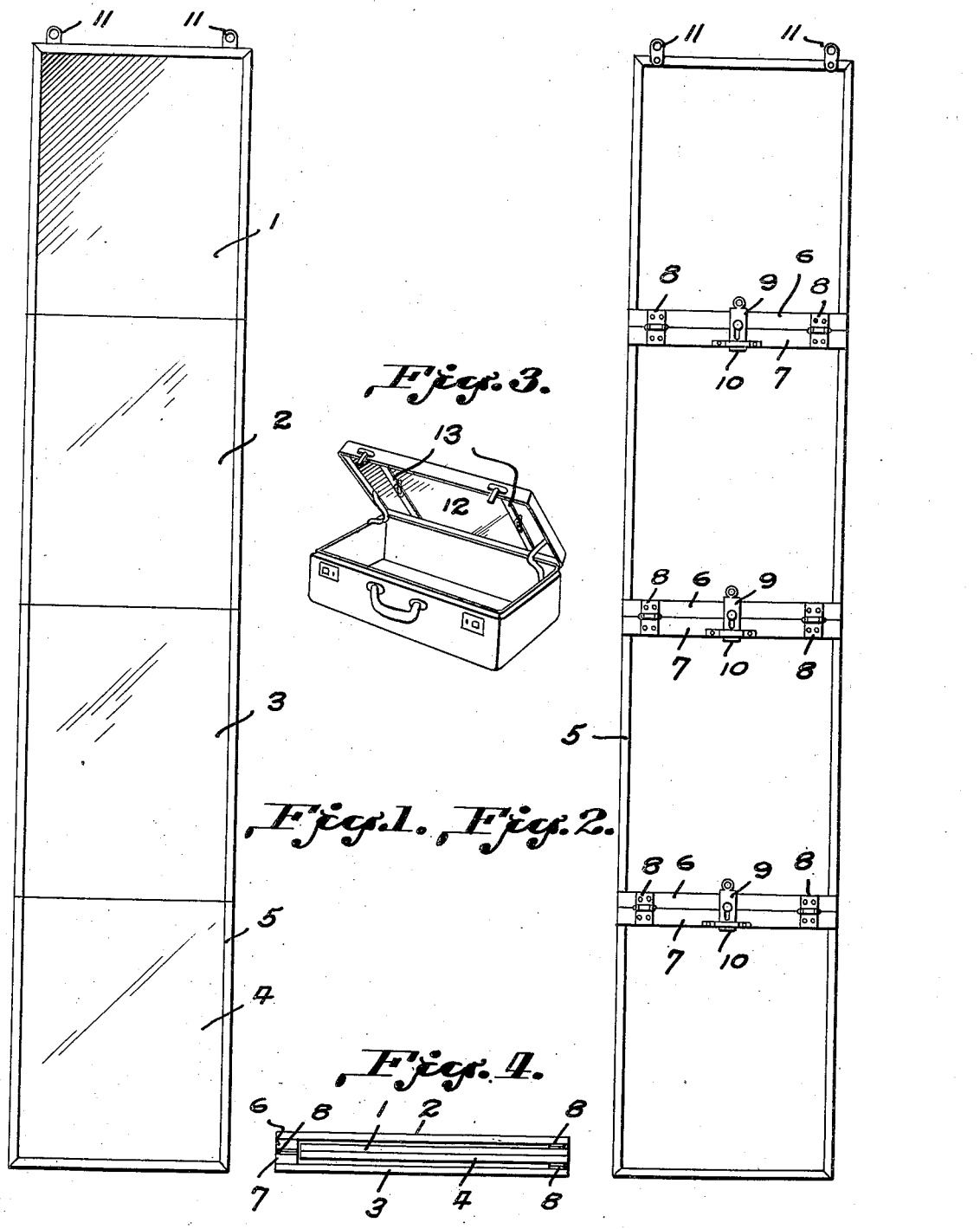
INVENTOR
Elizabeth G. Miller Patented July 19, 1938

2,124,146

UNITED STATES PATENT OFFICE 2,124,146

JAUNT FOLDING DRESS-MIRROR

Elizabeth Genevieve Miller, Madison, N. J.

Application December 13, 1937, Serial No. 179,571

3 Claims. (Cl. 88—73)

The invention relates to improvements in folding mirrors and the objects in the improvement are:

First, to provide a lightweight, metal, sectional folding mirror, for the use of the average adult as a dress or full-figure mirror, which can be strapped inside the top cover of a week-end bag and easily carried as a travel accessory;

Second, to allow as nearly an unbroken reflection as possible by framing only the outer sides of the mirror-sections, leaving unframed the sides of the mirror-sections which are contiguous when the mirror is in upright and bolted position.

One form of the invention is illustrated in the accompanying drawing, in which Figure 1 is a front elevation of my device, Figure 2 is a rear elevation and Figure 3 is a view in perspective of the device as applied to a week-end case. Fig. 4 is a view of the mirror in folded position.

The said mirror is composed of lightweight metal reflecting sections 1, 2, 3, and 4.

The edges of the three outer sides of each section preferably are enclosed in a narrow, metal framing or binding 5, the narrow metal binding being secured to the sections. On the front of the mirror sections, there is no framing on those sides which are contiguous when the mirror is in upright and bolted position. This lack of framing on the front of the said contiguous sides makes possible a nearly continuous reflection.

On the back of the mirror, horizontal metal strips 6 and 7 are secured to the inner and contiguous sides of the mirror-sections.

To these said horizontal strips are fastened: the hinges, 8; and the bolting device, 9 and 10.

Two metal rings, 11, are provided on the rear top of 1, so that the mirror, when in upright and bolted position, may be hung if desired.

The position of the said jaunt folding dress-mirror, packed in the compartment under the top of a week-end bag, is indicated at 12. Straps, 13, hold the mirror in place.

It is to be understood that the example of the invention disclosed herewith is a preferred model and that various changes in construction may be made which will not depart from the scope of the invention claimed.

I am aware that prior to my invention folding mirrors have been made. I therefore do not claim such an invention broadly; but

I claim:

1. A collapsible mirror comprising a series of hingedly connected reflecting sections having the contiguous sides of the sections unframed and means for maintaining the sections in rigid alignment comprising a plurality of bolting devices releasably engaging adjoining portions of each of the sections and means on one of the adjoining portions for supporting the bolt for movement to locking and releasing positions.

2. A mirror characterized as in claim 1 having horizontal strips secured on the back of the mirror to the inner and contiguous sides of the mirror sections and having the hinges secured to the strips.

3. A mirror as in claim 1 in which each section excepting the contiguous sides is enclosed in a framing or binding and mirror supporting means are provided on the top section.

ELIZABETH GENEVIEVE MILLER.